(12) United States Patent
Sievert et al.

(10) Patent No.: US 10,614,315 B2
(45) Date of Patent: *Apr. 7, 2020

(54) SYSTEMS AND METHODS FOR IDENTIFYING MOMENTS IN VIDEOS

(71) Applicant: GoPro, Inc., San Mateo, CA (US)

(72) Inventors: Otto Sievert, Oceanside, CA (US); Naveen Krishnamurthy, Fremont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,525

(22) Filed: Aug. 9, 2019

(65) Prior Publication Data

US 2019/0362158 A1 Nov. 28, 2019

Related U.S. Application Data

(63) Continuation of application No. 15/593,584, filed on May 12, 2017, now Pat. No. 10,395,122.

(51) Int. Cl.
*G06K 9/00* (2006.01)
*H04N 7/18* (2006.01)
*H04N 5/232* (2006.01)

(52) U.S. Cl.
CPC ..... *G06K 9/00765* (2013.01); *H04N 5/23241* (2013.01); *H04N 5/23245* (2013.01); *H04N 7/183* (2013.01)

(58) Field of Classification Search
CPC combination set(s) only.
See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |
| 7,885,426 B2 | 2/2011 | Golovchinsky |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

Ernoult, Emeric, 'How to Triple Your YouTube Video Views with Facebook', SocialMediaExaminer.com, Nov. 26, 2012, 16 pages.

(Continued)

*Primary Examiner* — Janese Duley
(74) *Attorney, Agent, or Firm* — Esplin & Associates, PC

(57) ABSTRACT

Physical storage media accessible to a remote device may store video information defining video content. The video content may be characterized by capture information. The remote device may transmit at least a portion of the capture information to a computing device. The computing device may identify one or more portions of the video content based on the transmitted capture information. The remote device may receive the identification of the identified portion(s) of the video content from the computing device. Responsive to the reception of the identification, the remote device may transmit the video information defining at least some of the identified portion(s) of the video content to the computing device.

22 Claims, 6 Drawing Sheets

(56) References Cited

U.S. PATENT DOCUMENTS

| | | |
|---|---|---|
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 9,824,477 B1 | 11/2017 | McDonald |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1 | 4/2010 | Liu |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0281710 A1 | 10/2015 | Sievert |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |

FOREIGN PATENT DOCUMENTS

| | | |
|---|---|---|
| JP | 2006053694 A | 2/2006 |
| JP | 2008059121 A | 3/2008 |
| JP | 2009053748 A | 3/2009 |
| JP | 2011188004 A | 9/2011 |
| WO | 2006001361 A1 | 1/2006 |

(56) References Cited

FOREIGN PATENT DOCUMENTS

| WO | 2009040538 A1 | 4/2009 |
|---|---|---|
| WO | 2012057623 A1 | 5/2012 |
| WO | 2012086120 A1 | 6/2012 |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015, 12 pgs.

Iandola et al., 'SqueezeNet: AlexNet-level accuracy with 50x fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Japanese Office Action for JP Application No. 2013-140131, dated Aug. 5, 2014, 6 pages.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Office Action for U.S. Appl. No. 13/831,124, dated Mar. 19, 2015, 14 pages.

Parkhi et al., 'Deep Face Recognition,' Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 7 pages.

PCT International Search Report and Written Opinion for PCT/US16/31076, dated Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

PSonar URL: http://www.psonar.com/about retrieved on Aug. 24, 2016, 3 pages.

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights Via Robust Recurrent Auto-encoders' arXiv:1510.01442v1 [cs.CV] Oct. 6, 2015 (9 pgs).

SYSTEMS AND METHODS FOR IDENTIFYING MOMENTS IN VIDEOS

FIELD

This disclosure relates to identifying moments in videos by using capture information exchanged between devices to identify one or more portions of video content.

BACKGROUND

Transferring entirety of video content between devices may be resource (time, processing, storage) intensive. Resources required to transfer video content between devices may decrease video content usage.

SUMMARY

This disclosure relates to identifying moments in videos. Physical storage media accessible to a remote device may store video information defining video content. The video content may be characterized by capture information. The remote device may transmit at least a portion of the capture information to a computing device. The computing device may identify one or more portions of the video content based on the transmitted capture information. The remote device may receive the identification of the identified portion(s) of the video content from the computing device. Responsive to the reception of the identification, the remote device may transmit the video information defining at least some of the identified portion(s) of the video content to the computing device.

A system that identifies moments in videos may include one or more computing devices, remote devices, and/or other components. The computing device(s) and the remote device(s) may include one or more processors and/or other components. In some implementations, the computing device may include a mobile device, a server, and/or another computing device. In some implementations, the remote device may include an image capture device and/or another remote device.

A physical storage media accessible to the remote device may store video information and/or other information. The video information may define video content and/or other content. The video content may be characterized by capture information and/or other information. The capture information may be part of the video information and/or separate from the video information. The capture information may be stored with the video information or separately from the video information.

In some implementations, the capture information may include one or more of capture location information, capture time information, capture motion information, audio information, interest curve information, average color information, histogram information, and/or other information characterizing the video content. The capture location information may define one or more capture locations of the video content. The capture time information may define one or more capture times of the video content. The capture motion information may define one or more capture motion of the video content. The audio information may define one or more audio tracks of the video content. The interest curve information may define values of one or more interest metrics for the video content. The average color information may define average colors of visuals captured within the video content. The histogram information may define one or more histograms of the visuals captured within the video content.

The video content may have been captured by one or more image capture devices. In some implementations, at least a portion of the capture information may be generated by one or more image signal processors of the image capture device(s).

The processor(s) of the remote device and the computing device may be configured by machine-readable instructions. Executing the machine-readable instructions may cause the processor(s) to facilitate identifying moments in videos. The machine-readable instructions may include one or more computer program components. The computer program components of the remote device may include one or more of a capture information transmission component, an identification reception component, an identified portion component, and/or other computer program components. The computer program components of the computing device may include one or more of a capture information reception component, an identification component, an identification transmission component, and/or other computer program components.

The capture information transmission component may be configured to transmit at least a portion of the capture information and/or other information to the computing device. The capture information reception component may be configured to receive at least the portion of the capture information and/or other information from the remote device. In some implementations, the remote device may be configured to operate in an advertisement mode to advertise the availability of capture information and/or other information to the computing device. In some implementations, the remote device may be configured to operate in a transfer mode to transmit at least the portion of the capture information and/or other information to the computing device. In some implementations, the computing device may be configured to prompt the remote device to change its operation from the advertisement mode to the transfer mode.

The identification component may be configured to identify one or more portions of the video content based on the capture information transmitted by the remote device and/or other information. In some implementations, identifying the portion(s) of the video content based on the capture information may include the computing device identifying one or more undesired portions of the video content based on at least some of the capture information and/or other information. The undesired portion(s) of the video content may not overlap with the identified portion(s) of the video content.

The identification transmission component may be configured to transmit the identification of the one or more identified portions of the video content and/or other information to the remote device. The identification reception component may be configured to receive the identification of the one or more identified portions of the video content and/or other information.

The identified portion component may be configured to, responsive to the reception of the identification, perform one or more operations on at least some of the identified portion(s) of the video content. In some implementations, the one or more operations may include transmitting the video information defining at least some of the identified portion(s) of the video content and/or other information to the computing device and/or other devices. In some implementations, the one or more operations may include notifying a user regarding at least some of the identified portion(s) of the video content. In some implementations, the one or more operations may include presenting at least some of the identified portion(s) of the video content on a display.

In some implementations, transmitting the video information defining at least some of the identified portion(s) of the video content may include: (1) generating derivative visual information defining one or more derivative visual content based on the identified portion(s) of the video content; (2) transmitting the derivative visual information defining the derivative visual content to the computing device; (3) receiving one or more selections of the derivative visual content from the computing device; and (4) transmitting the video information defining the identified portion(s) of the video content corresponding to the selected derivative visual content to the computing device.

In some implementations, the remote device may be configured to operate in different modes. The remote device may be configured to operate in an advertisement mode to advertise availability of the capture information and/or other information to the computing device. The remote device may be configured to operate in a transfer mode to transmit at least the portion of the capture information and/or other information to the computing device. The remote device operating in the advertisement mode may consume less power than the remote device operating in the transfer mode.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
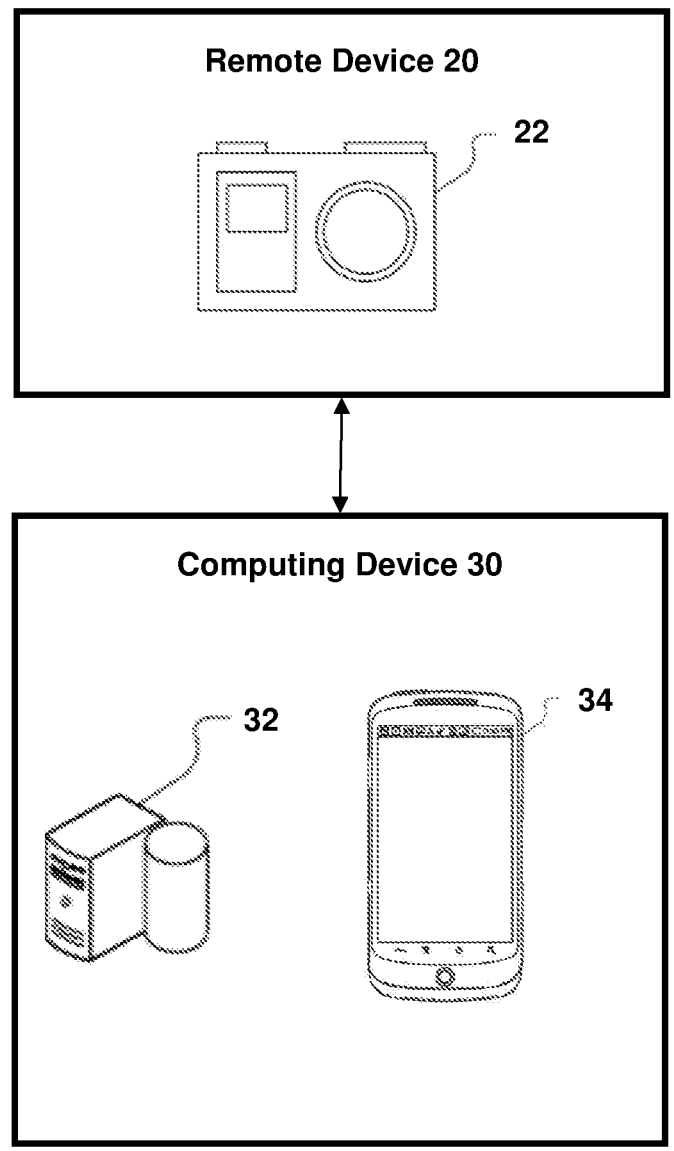
FIG. 1A illustrates an example system that identifies moments in videos.

FIG. 1 illustrates a system 10 for identifying moments within videos. The system 10 may include one or more of a remote device 20, a computing device 30, and/or other devices/components. Physical storage media accessible to the remote device 20 may store video information defining video content. The video content may be characterized by capture information. The remote device 20 may transmit at least a portion of the capture information to a computing device 30. The computing device 30 may identify one or more portions of the video content based on the transmitted capture information. The remote device 20 may receive the identification of the identified portion(s) of the video content from the computing device 30. Responsive to the reception of the identification, the remote device 20 may transmit the video information defining at least some of the identified portion(s) of the video content to the computing device 30.

The remote device 20 may refer to a computing device that has access to physical storage media storing video information. The physical storage media (e.g., electronic storage) may be part of the remote device 20 or separate from the remote device 20 (e.g., accessible via network communication, removable storage). In some implementations, the remote device may include an image capture device 22 and/or other remote devices. The image capture device 22 may refer to a device capable of capturing and/or storing videos using one or more image sensors. The videos may be captured at a location or over a range of locations. As a non-limiting example, the image capture device 22 may include a camera (e.g., action camera), a mobile device (e.g., smartphone, tablet), and/or other image capture devices.

The computing device 30 may refer to a device that may provide one or more processing capabilities for the remote device 20. The computing device 30 may include one or more of a mobile device 32, a server 34, and/or other computing devices. In some implementations, the remote device 20 may be configured to communicate with the computing device 30 through one or more networks. In some implementations, the remote device 20 may be configured to communicate directly with the computing device 30. The communication between the remote device 20 and the computing device 30 may include wired communication and/or wireless communication.

Figure 1B:
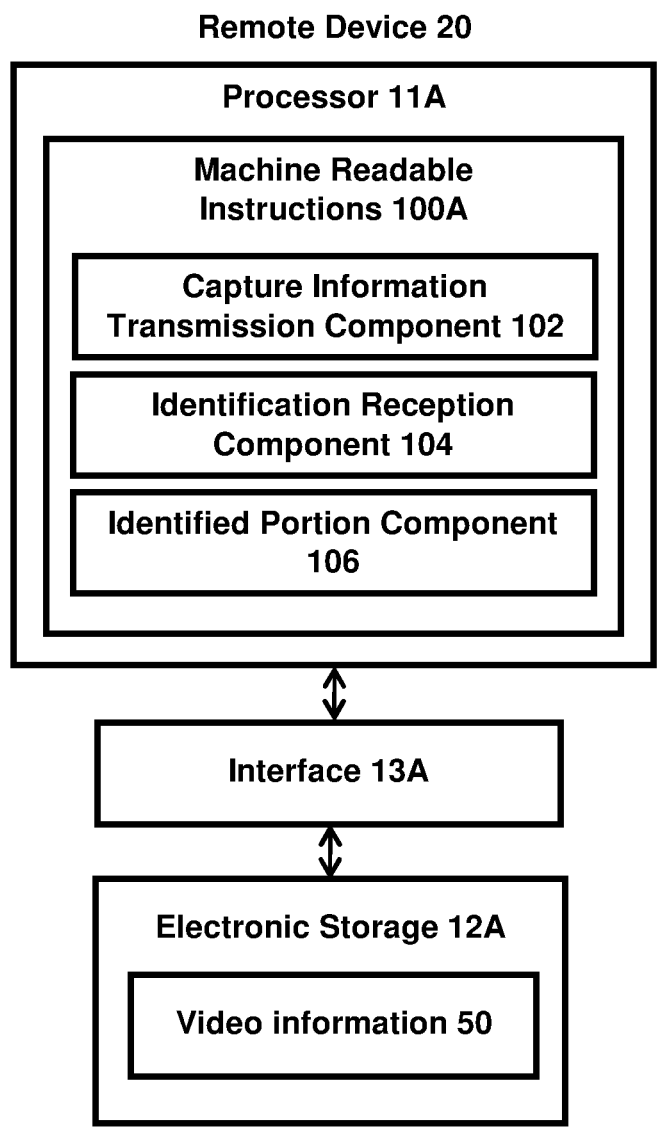
FIG. 1B illustrates an example remote device.
Figure 1C:
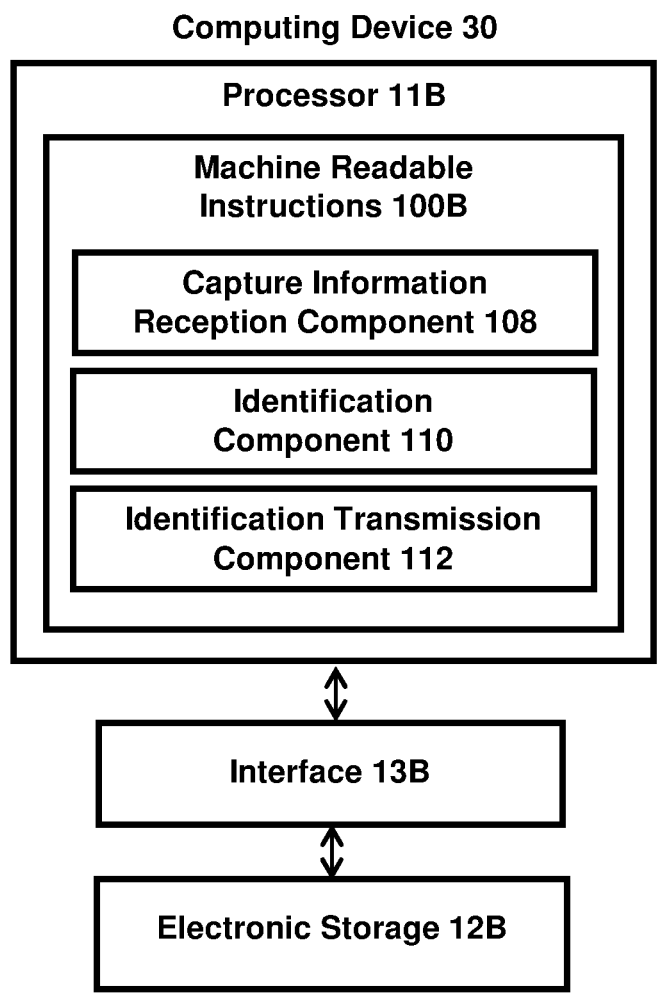
FIG. 1C illustrates an example computing device.

FIG. 1B illustrates an example remote device 20. The remote device 20 may include one or more of a processor 11A, an electronic storage 12A, an interface 13A (e.g., bus, wireless interface), and/or other components. FIG. 1C illustrates an example computing device 30. The computing device 30 may include one or more of a processor 11B, an electronic storage 12B, an interface 13B (e.g., bus, wireless interface), and/or other components.

The electronic storage 12A 12B may be configured to include electronic storage medium that electronically stores information. The electronic storage 12A, 12B may store software algorithms, information determined by the processor 11A, 11B, information received remotely, and/or other information that enables the system 10 to function properly. For example, the electronic storage 12A, 12B may store information relating to one or more of video information, video content, capture information, the remote device 20, the computing device 30, identifying portions within the video content, identified portions of the video content, operations to performed on the identified portions of the video content, and/or other information.

A physical storage media accessible to the remote device 20 may store video information and/or other information. The physical storage media may be part of the remote device 20 or separate from the remote device 20 (e.g., accessible via network communication). For example, the physical storage media may include the electronic storage 12A. The electronic storage 12A may store video information 50 and/or other information. The video information 50 may be stored in other locations.

The video information 50 may define video content and/or other content. Video content may refer to media content that may be consumed as one or more videos. Video content may include one or more videos stored in one or more formats/container, and/or other video content. The video content may have a progress length. The video content may be characterized by capture information and/or other information. The capture information may be part of the video information and/or separate from the video information. The capture information may be stored with the video information (e.g., stored as part of the video file, metadata included in the video file) or separately from the video information (stored as a file separate from the video file, metadata not included in the video file).

The capture information may provide information that allows the computing device 30 to identify one or more portions of the video content. The capture information may characterize the whole video content or one or more portions of the video content. The capture information may include general information applicable to the whole video content (e.g., information relating to image capture device/software that captured the video content, fixed capture framerate, fixed capture resolution, a single capture location) and/or specific information applicable to certain portions of the video content (e.g., different capture framerates, different capture resolutions, different capture locations, different capture motions, different captured visuals/audio for different portions of the video content).

In some implementations, the capture information may include one or more of capture location information, capture time information, capture motion information, audio information, interest curve information, average color information, histogram information, and/or other information characterizing the video content. The capture location information may define one or more capture locations (location in which the video content was captured) of the video content. The capture time information may define one or more capture times (e.g., time/date/duration of capture) of the video content. The capture motion information may define one or more capture motion (motion of the capture device) of the video content. The audio information may define one or more audio tracks of the video content. The interest curve information may define values of one or more interest metrics for the video content. An interest metric may refer to one or more measurements indicating whether portions of the video content include capture of visuals that are of interest to one or more users. The average color information may define average colors of visuals captured within the video content. The histogram information may define one or more histograms (e.g., image histogram, color histogram, luminance histogram) of the visuals captured within the video content.

In some implementations, the capture information may include other information gathered during or adjacent to capture of video content. The capture information may have been gathered by the image capture device(s) capturing the video content and/or other devices (e.g., other sensors). For example, the capture information may include outputs from sensors near the image capture device(s), such as biometric sensors (e.g., heart rate sensor), vehicle sensors (e.g., measuring speed, acceleration, direction, temperature), stationary sensors (e.g., sensors affixed to building/structure), mobile sensors (e.g., sensors moving with an object/attached to a moving object), and/or other sensors. Other types of capture information are contemplated.

In some implementations, at least a portion of the capture information may be generated by one or more image signal processors of one or more image capture devices that captured the video content. For example, the video content may have been captured by the image capture device 22. The image signal processor(s) of the image capture device 22 may provide information/statistics regarding one or more portions of the video content as capture information. For example, the image signal processor(s) may provide statics relating to sampling and/or encoding of the video content, such as average colors of the visuals captured within the video content and/or histogram information, at low cost (e.g., fast operation, low consumption of battery power). Use of the capture information generated by the image signal processor(s) may enable the computing device 30 to identify moments within video content using already existing information and/or information generated at low cost.

In some implementations, at least a portion of the capture information may be generated by one or more signal processors (e.g., sensors) external to the image capture device 22. The portion of the capture information may be generated by the external signal processor(s) during the capture of the video content by the image capture device 22. The capture information generated by external signal processor(s) may be transmitted to the image capture device 22 for storage. The image capture device may store the portion of the capture information with/coincident with the video information and/or other capture information.

The processor 11A, 11B may be configured to provide information processing capabilities in the system 10, the remote device 20, and/or the computing device 30. As such, the processor 11A, 11B may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11A, 11B may be configured to execute one or more machine readable instructions 100A, 100B to facilitate identifying moments within videos. The machine readable instructions 100A, 100B may include one or more computer program components. The machine readable instructions 100A may include one or more of a capture information transmission component 102, an identification reception component 104, an identified portion component 106, and/or other computer program components. The machine readable instructions 100B may include one or more of a capture information reception component 108, an identification component 110, an identification transmission component 112, and/or other computer program components.

The capture information transmission component 102 may be configured to transmit at least a portion of the capture information and/or other information to the computing device 30. The capture information transmission component 102 may transmit one or more portions of the capture information to the computing device 30 without transmitting the video information 50 defining the video content. The capture information transmission component 102 may transmit the portion(s) of the capture information before transmitting the video information 50 defining the video content (or one or more portions of the video information 50 defining the video content).

The capture information reception component 108 may be configured to receive at least the portion of the capture information and/or other information transmitted by the remote device 20. The capture information reception component 108 may receive the portion(s) of the capture information before/without receiving the video information 50 defining the video content (or one or more portions of the video information 50 defining the video content). Receiving the capture information before/without the video information 50 may enable the computing device 30 to identify one or more portions of the video content without having the video information 50 defining the video content.

In some implementations, the remote device 20 may be configured to operate in an advertisement mode to advertise the availability of capture information and/or other information to the computing device 30. In some implementations, the remote device 20 may be configured to operate in a transfer mode to transmit at least the portion of the capture information and/or other information to the computing device 30. In some implementations, the computing device 30 may be configured to prompt the remote device 20 to change its operation from the advertisement mode to the transfer mode.

The identification component 110 may be configured to identify one or more portions of the video content based on the capture information transmitted by the remote device 20 and/or other information. One or more portions of the video content corresponding to particular moments (e.g., particular points/duration within the progress of the video content) in the video content may be identified based on the capture information. For example, the identification component 110 may identify one or more portions of the video content based on one or more of capture location information, capture time information, capture motion information, audio information, interest curve information, average color information, histogram information, and/or other information characterizing the video content. Identification component 110 may compare the values of the capture information to one or more threshold/particular values to determine portions of the video content containing one or more particular moments. For example, the identification component 110 may use the capture information to identify portions of the video content containing moments captured at particular locations, moments captured at particular times, moments captured for particular durations, moments captured using particular motions, moments including particular audio/sounds, moments including particular visuals/activity/scene/thing, moment including particular (and/or average/distribution of) colors, tones, intensity, brightness, luminosity, contrast, and/or portions of video content containing/associated with other information.

Figure 3A:
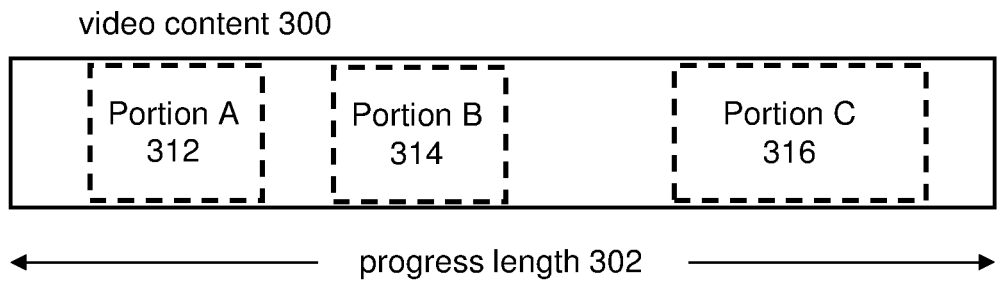
FIGS. 3A-3C illustrates example identification of portions of video content.
Figure 3B:
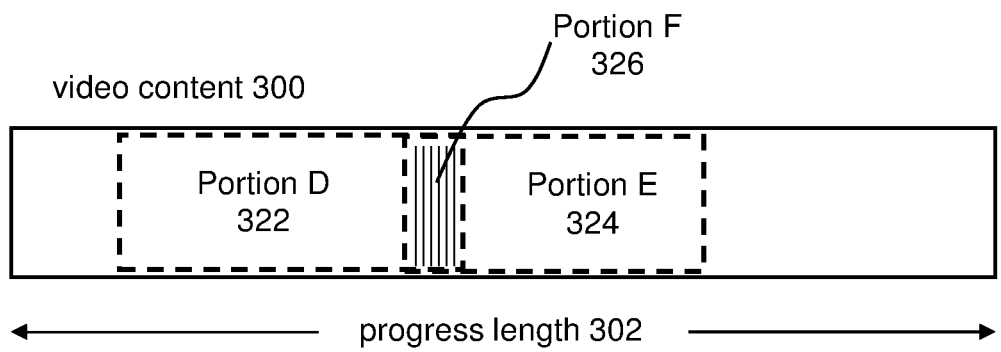
Figure 3C:
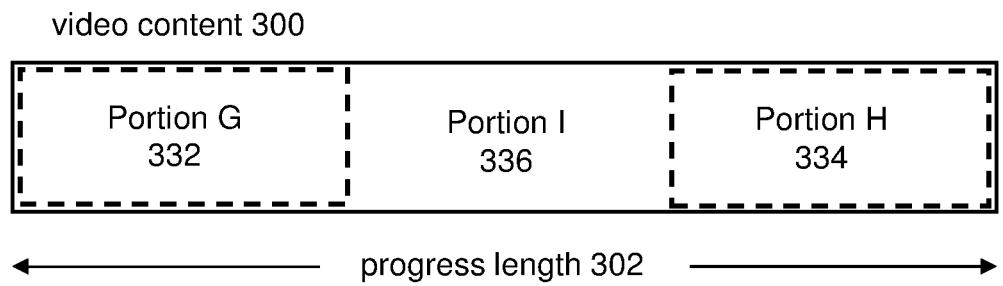

FIGS. 3A-3C illustrates example identifications of portions of video content 300. The video content 300 may have a progress length 302 (defined via capture/play duration and/or number of frames). The identification component 110 may identify one or more portions of the video content 300. A portion may include a point or a duration in the progress length 302. For example, in FIG. 3A, the identification component 110 may identify three portions (a portion A 312, a portion B 314, a portion C 316) of the video content 300 based on the capture information. The portions 312, 314, 316 may occur at different moments in the progress of the video content 300.

In FIG. 3B, the identification component 110 may identify two portions (a portion D 322, a portion E 324) of the video contents based on the capture information. The portions 322, 324 may overlap, identifying a portion F 326. In some implementations, the identifications of the identified portions of the video content 300 (to be transmitted to the computing device 30) may include (1) the portion D 322 and the portion E 324, (2) the portion D 322, the portion E 324, and the portion F 326, (3) the portion F 326, and/or other combinations of the portions 322, 324, 326 (e.g., the portion D 322 and the portion E 324 may be merged into a single portion based on the overlap).

In some implementations, identifying the portion(s) of the video content based on the capture information may include the identification component 110 identifying one or more undesired portions of the video content based on at least some of the capture information and/or other information. Certain types/values of capture information may not provide a good basis for determining interesting/desirable moments captured within the video content, but may provide a good basis for determine uninteresting/undesirable moments captured within the video content. For example, average RGB values/statistics calculated by the image signal processor(s) of the image capture device may not provide a good basis for identifying highlight/desirable moments, but may provide a good basis for the identification component 110 to determine when certain moments within the video content are not interesting/desirable. The undesired portion(s) of the video content may not overlap with the identified portion(s) of the video content—that is, the identification component 30 may identify portions of the video content based on a negative (the identified portions of the video content include inverse of the undesired portions).

For example, FIG. 3C illustrates identification of video portion(s) based on identifying undesired portion(s) of the video content 300. In FIG. 3C, the identification component 110 may identify two undesired portions (a portion G 332, a portion H 334) of the video contents based on the capture information. The desired portion of the video content 300 may be identified based on the inverse of the undesired portions 332, 334—the desired portion may be identified as a portion I 336. In some implementations, the identifications of the identified portions of the video content 300 (to be transmitted to the computing device 30) may include (1) the portion G 332 and the portion H 334, (2) the portion G 332, the portion H 334, and the portion I 336, (3) the portion I 336, and/or other combinations of the portions 332, 334, 336.

Transmitting/receiving the capture information before transmitting/receiving the video information defining the video content, and using the capture information to identify video portion(s) may enable the system 10 to conserve resources (e.g., bandwidth of communication between the remote device 20 and the computing device 30, processing by the remote device 20/the computing device 30, power/battery of the remote device 20/the computing device 30, storage space of the computing device 30) in identifying interesting moments within the video content and/or performing other operations on identified portion(s) of the video content.

For example, moments of interest/highlight moments may be identifiable from audio of the video content and/or telemetry readings (e.g., location information, capture motion information) from recording of the video content. The audio and/or telemetry readings may be much smaller (e.g., hundreds to thousands of times) than the video information defining the video content (e.g., the video file). Rather than transmitting large video files, which may consume a lot of resources, the audio and telemetry readings may be transmitted by the remote device 20 to the computing device 30. The computing device 30 may use the audio and telemetry readings to identify portions of the video content containing moments of interest/highlight moments/undesired moments and transmit the identification of the portions to the remote device 20 for further processing (e.g., video edit, video display, video transmission). Such use of capture information may consume less power/battery/processing resources of the remote device 20 and/or the computing device 30. Such use of capture information may allow the computing device 30 to use its (limited) storage space to store desired portions of the video content, rather than storing the entirety of the video content.

The identification transmission component 110 may be configured to transmit the identification of the one or more identified portions of the video content and/or other information to the remote device 20. The identification reception component 104 may be configured to receive the identification of the one or more identified portions of the video content and/or other information from the computing device 30. The transmission of the identification may be completed in a single communication session or multiple communication sessions (e.g., resume after losing connection).

The identified portion component 106 may be configured to, responsive to the reception of the identification of the portions of the video content, perform one or more operations on at least some of the identified portion(s) of the video content. An operation on a portion of the video content may include an operation that provides the portion to another device (e.g., transmitting the portion), an operation that provides information regarding the portion of the video content (e.g., providing notification about the portion, displaying the portion), an operation that makes changes to the portion of the video content (e.g., compressing the portion, editing the portion), and/or other operations. For example, the operation(s) may include transmitting the video information defining at least some of the identified portion(s) of the video content and/or other information to the computing device 30 and/or other devices. The video information defining the identified portion(s) of the video content may be transmitted by the remote device 20 without/separately from the video information defining other portion(s) of the video content. The operation(s) may include notifying a user regarding at least some of the identified portion(s) of the video content. For example, the remote device 20, the computing device 30, and/or another device may alert a user that one or more portions of the video content are available for viewing (based on the identification). The operation(s) may include presenting at least some of the identified portion(s) of the video content on a display (e.g., on the remote device 20, the computing device 30, and/or another device). For example, a user may use the remote device, 20, the computing device 30, and/or another device to view one or more of the identified portions of the video content (e.g., via highlight moment user interface, video summary). The operation(s) may include making changes to the video content, such as compressing, extracting, and/or editing at least some of the identified portion(s) of the video content. Other operations are contemplated.

In some implementations, transmitting the video information defining at least some of the identified portion(s) of the video content may include the remote device 20 generating derivative visual information defining one or more derivative visual content based on the identified portion(s) of the video content. Derivative visual content may refer to derivative video content and/or derivative images. Individual derivative visual content may correspond to and may be generated from the individual identified portions of the video content. The individual derivative visual content may be characterized by lower fidelity than the corresponding individual identified portions of the video content. Lower fidelity may include one or more of lower resolution, lower framerate, higher compression, and/or other lower fidelity. The derivative visual information may be transmitted to the computing device 30. One or more of the derivative visual content may be selected through/by the computing device 30 for further operations. The selection may be made based on computer analysis of the derivative visual content and/or user selection (e.g., a user selecting one or more derivative visual content via a mobile device). The remote device 20 may receive one or more selections of the derivative visual content from the computing device 30. Responsive to reception of the selection, the remote device 20 may transmit the video information defining the identified portion(s) of the video content corresponding to the selected derivative visual content to the computing device 30.

In some implementations, information may be communicated between the remote device 20 and the computing device 30 based on the availability/response from the remote device 20 and/or the computing device 30. The remote device 20 may seek to communicate with the computing device 30 based on availability of video content for viewing/offloading. For example, the remote device 20 may include/have access to new video content (e.g., new video content since prior syncing/communication between the remote device 20 and the computing device 30) and/or video content not yet downloaded by the computing device 30. The remote device 20 may use one or more communication protocols (e.g., BLE, iBeacon) to advertise the availability of the video content and/or the availability of capture information characterizing the video content to the computing device 30. For example, one or more flags may be used to indicate the availability of new video content/new capture information and/or video content not yet downloaded/capture information not yet downloaded by the computing device 30. In some implementations, the remote device 20 may advertise the availability of video content and the computing device 30 may check video content it has previously downloaded/included in its storage to determine whether the remote device 20 has different video content.

In response to being alerted that the remote device 20 has video content/capture information to be downloaded, the computing device 30 may request the capture information from the remote device 20. The request from the computing device 30 may be automatic and may not require input from a user. For example, responsive to being alerted that the remote device 20 has video content/capture information to be downloaded, the computing device 30 may run an application that establishes other communications/controls between the computing device 30 and the remote device 20. The application may confirm that the remote device 20 has new video content/capture information.

The computing device 30 (e.g., the application started by the computing device 30) may receive the capture information and identify one or more portions of the video content for additional operations (e.g., by the remote device 20 and/or the computing device 30). A user may use the computing device 30 (e.g., the application started by the computing device 30) to view and/or edit one or more identified portions of the video content. In some implementations, the capture information and/or video information defining one or more of the identified portions of the video content may be (temporarily) stored by the computing device 30. When the user interacts with the application, the user may be presented with the option(s) to view, edit, delete, and/or otherwise consume the identified portion(s) of the video content.

In some implementations, the remote device 20 may be configured to operate in different modes. The remote device 20 may be configured to operate in an advertisement mode to advertise availability of the capture information, the video content, and/or other information to the computing device 30. The remote device 20 may be configured to operate in a transfer mode to transmit at least a portion of the capture information, the video information, and/or other information to the computing device 30. The remote device 20 operating in the advertisement mode may consume less power than the remote device 20 operating in the transfer mode.

For example, the remote device 20 may include an image capture device. The image capture device may operate in the advertisement mode to try to detect when a computing device 30 is nearby/ready to receive the capture information. The image capture device may change its operating mode to the transfer mode based on detection of the computing device 30/response from the computing device 30. For example, the computing device 30 may receive the advertisement from the image capture device that it has new capture information/video content. In response, the computing device 30 may "wake up" the image capture device by prompting the image capture device to change its operating mode from the advertisement mode to the transfer mode. Changing the operating mode of the image capture device may remotely turn on the image capture device from a standby/low-power operation. Under the transfer mode, the image capture device may offload capture information and/or video content to the computing device. Since operating in the advertisement mode consumes less power than operating in the transfer mode, using the advertisement mode may allow the image capture device to conserve power by waking up when the computing device 30 is ready to receive/requesting the capture information/video content.

In some implementations, one or more functionalities of the remote device 20 may be included in/performed by the computing device 30. In some implementations, one or more functionalities of the computing device 30 may be included in/performed by the remote device 20. For example, one or more functionalities of the identification component 110 of the computing device 30 may be included in/performed by the remote device 20. In such a case, the analysis of the capture information to identify one or portions of the video content may be determined by the remote device 20, rather than the computing device 30. Migrating the functionalit(ies) of the identification component 110 from the computing device 30 (e.g., mobile device) to the remote device 20 (e.g., image capture device) may enable the remote device 20 to identify desired/undesired portions of the video content without communicating with the computing device 30. Other migrations of the functionalities of the remote device 20 and/or the computing device 30 are contemplated.

Figure 4:
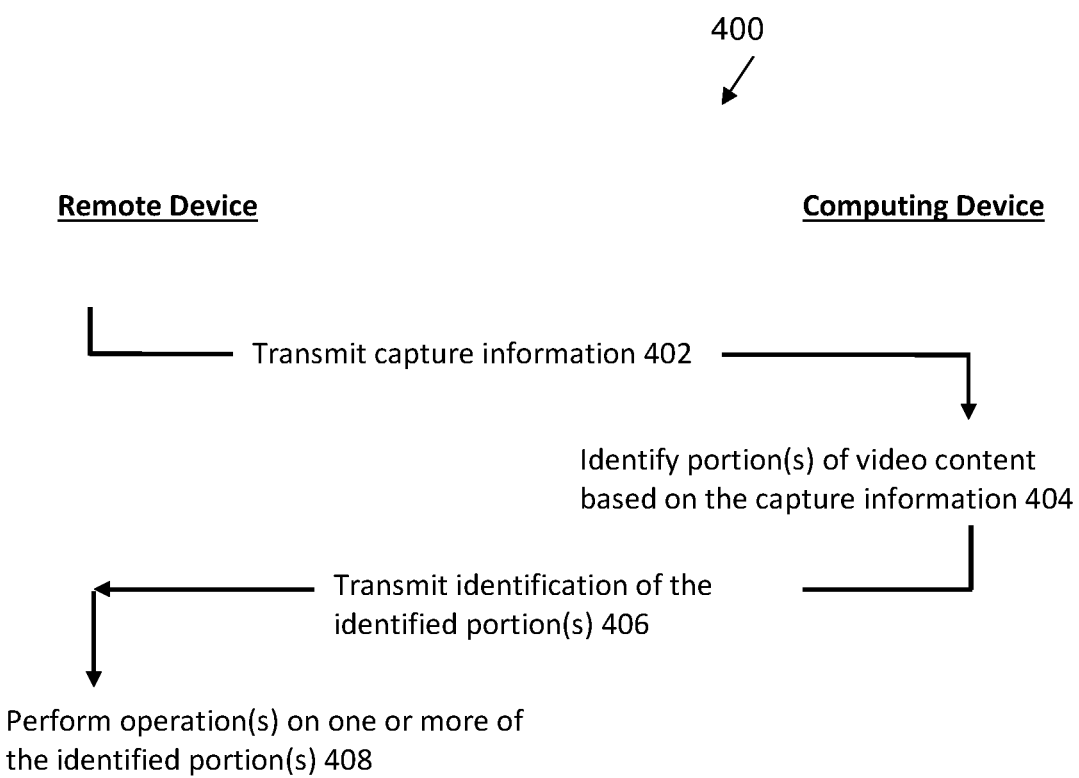
FIG. 4 illustrates an example process flow of a remote device and a computing device for identifying moments in videos.

FIG. 4 illustrates exemplary process flow of a remote device (e.g., the remote device 20) and a computing device (e.g., the computing device 30) for identifying moments in videos. The remote device may have access to video information defining video content. The video content may be characterized by capture information. The remote device may transmit some or all of the capture information 402 to the computing device. The computing device may identify one or more portions of the video content based on the received captured information 404. The computing device may transmit identification of the identified portion(s) of the video content 406 to the remote device. The remote device may perform one or more operations on one or more of the identified portion(s) of the video content 408.

In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. The captured images/videos may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11A, 11B and electronic storage 12A, 12B are shown to be connected to interface 13A, 13B in FIGS. 1B-1C, any communication medium may be used to facilitate interaction between any components of system 10 (e.g., the remote device 20, the computing device 30). One or more components of system 10 may communicate with each other through hard-wired communication, wireless communication, or both. For example, one or more components of system 10 may communicate with each other through a network. For example, processor 11A, 11B may wirelessly communicate with electronic storage 12A, 12B. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11A, 11B are shown in FIGS. 1B-1C as a single entity, this is for illustrative purposes only. In some implementations, the processor 11A, 11B may comprise a plurality of processing units. These processing units may be physically located within the same device, or the processor 11A, 11B may represent processing functionality of a plurality of devices operating in coordination. The processor 11A, 11B may be configured to execute one or more components by software; hardware; firmware; some combination of software, hardware, and/or firmware; and/or other mechanisms for configuring processing capabilities on the processor 11A, 11B.

It should be appreciated that although computer components are illustrated in FIGS. 1B-1C as being co-located within a single processing unit, in implementations in which the processor 11A, 11B comprises multiple processing units, one or more of computer program components may be located remotely from the other computer program components.

While the computer program components are described herein as being implemented via processor 11A, 11B through machine readable instructions 100A, 100B, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11A, 11B may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12A, 12B may be provided integrally (i.e., substantially non-removable) with one or more components of the system 10 (e.g., the remote device 20, the computing device 30) and/or removable storage that is connectable to one or more components of the system 10 via, for example, a port (e.g., a USB port, a Firewire port, etc.) or a drive (e.g., a disk drive, etc.). The electronic storage 12A, 12B may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12A, 12B may be a separate component within the system 10, or the electronic storage 12A, 12B may be provided integrally with one or more other components of the system 10 (e.g., the processor 11A, 11B). Although the electronic storage 12A, 12B are shown in FIGS. 1B-1C as a single entity, this is for illustrative purposes only. In some implementations, the electronic storage 12A, 12B may comprise a plurality of storage units. These storage units may be physically located within the same device, or the electronic storage 12A, 12B may represent storage functionality of a plurality of devices operating in coordination.

Figure 2:
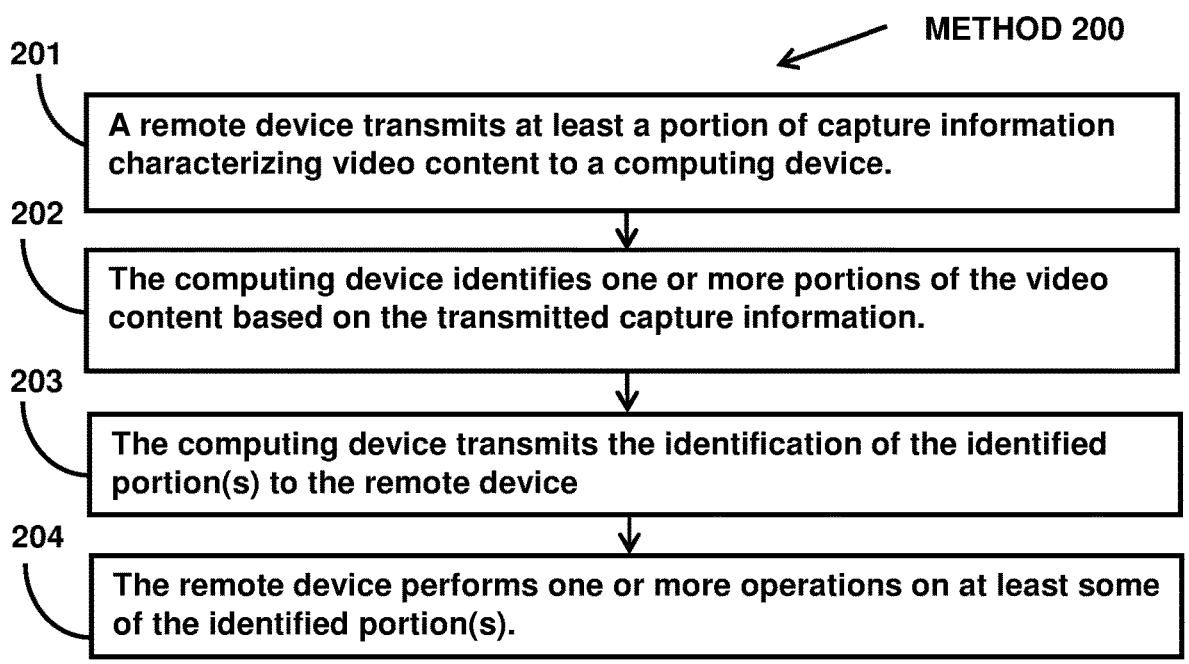
FIG. 2 illustrates an example method for identifying moments in videos.

FIG. 2 illustrates method 200 for identifying moments within videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, a remote device may transmit at least a portion of capture information characterizing video content. The capture information may be transmitted to a computing device. In some implementations, operation 201 may be performed by a processor component the same as or similar to the capture information transmission component 102 (Shown in FIG. 1B and described herein).

At operation 202, the computing device may identify one or more portions of the video content based on the transmitted capture information. In some implementations, operation 202 may be performed by a processor component the same as or similar to the identification component 110 (Shown in FIG. 1C and described herein).

At operation 203, the computing device may transmit the identification of the identified portion(s). The identification of the identified portion(s) may be transmitted to the remote device. In some implementations, operation 203 may be performed by a processor component the same as or similar to the identification transmission component 112 (Shown in FIG. 1C and described herein).

At operation 204, the remote device may, responsive to the reception of the identification, perform one or more operations on at least some of the identified portion(s) of the video content. In some implementations, operation 204 may be performed by a processor component the same as or similar to the identified portion 106 (Shown in FIG. 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies moments in videos, the system comprising:
one or more physical processors configured by machine-readable instructions to:
transmit capture information characterizing capture of video content by an image capture device and/or the video content captured by the image capture device to a computing device prior to transmission of video information defining the video content to the computing device, the capture information enabling the computing device to identify one or more portions of the video content prior to reception of the video information;
receive the identification of the one or more identified portions of the video content from the computing device; and
responsive to the reception of the identification, transmit the video information defining at least some of the one or more identified portions of the video content to the computing device.

2. The system of claim 1, wherein the capture information includes one or more of capture location information defining capture locations of the video content, capture time information defining capture times of the video content, capture motion information defining capture motion of the video content, audio information defining an audio track of the video content, interest curve information defining values of an interest metric for the video content, average color information defining average colors of visuals captured within the video content, or histogram information defining one or more histograms of the visuals captured within the video content, and the computing device identifies the one or more portions of the video content based on the one or more of the capture location information, the capture time information, the capture motion information, the audio information, the interest curve information, the average color information, or the histogram information.

3. The system of claim of 1, wherein at least a portion of the capture information is generated by an image signal processor of the image capture device that captured the video content.

4. The system of claim 1, wherein at least a portion of the capture information is generated by a signal processor external to the image capture device that captured the video content, the portion of the capture information generated by the signal processor during the capture of the video content, wherein the portion of the capture information is transmitted to the image capture device for storage.

5. The system of claim 1, wherein the one or more physical processors are, to transmit the video information defining at least some of the one or more identified portions of the video content, further configured by the machine-readable instructions to:
generate derivative visual information defining one or more derivative visual content based on the one or more identified portions of the video content, individual derivative visual content corresponding to and generated from the individual identified portions of the video content, the individual derivative visual content characterized by lower fidelity than the corresponding individual identified portions of the video content;
transmit the derivative visual information defining the one or more derivative visual content to the computing device;
receive one or more selections of the derivative visual content from the computing device; and
transmit the video information defining one or more of the identified portions of the video content corresponding to the one or more selected derivative visual content to the computing device.

6. The system of claim 1, wherein the computing device identifying the one or more portions of the video content based on the capture information includes:
the computing device identifying one or more undesired portions of the video content based on at least some of the capture information; and
the computing device identifying the one or more portions of the video content based on an inverse of the one or more undesired portions of the video content.

7. The system of claim 1, wherein the one or more physical processors are included in the image capture device, and the computing device includes a mobile device or a server.

8. The system of claim 7, wherein:
the image capture device is configured to switch between operation in an advertisement mode to advertise availability of the capture information to the computing device and operation in a transfer mode to transmit the capture information to the computing device;
the image capture device operates in the advertisement mode to detect when the computing device is ready to receive the capture information;
the image capture device operates in the transfer mode responsive to detection of the computing device; and
the image capture device operating in the advertisement mode consumes less power than the image capture device operating in the transfer mode.

9. The system of claim 1, wherein the computing device identifying the one or more portions of the video content based on the capture information includes:
the computing device identifying a first portion and a second portion of the video content based on the capture information; and
the computing device identifying a third portion of the video content based on the first portion and the second portion, the third portion including an overlap of the first portion and the second portion;
wherein the one or more identified portions of the video content include the third portion.

10. A system that identifies moments in videos, the system comprising:
one or more physical processors configured by machine-readable instructions to:
receive capture information for video content from a remote device prior to reception of video information defining the video content from the remote device, the capture information characterizing capture of the video content by an image capture device and/or the video content captured by the image capture device, the capture information enabling the one or more physical processors to identify one or more portions of the video content prior to reception of the video information;

identify, prior to the reception of the video information, the one or more portions of the video content based on the capture information;

transmit the identification of the one or more identified portions of the video content to the remote device; and receive the video information defining at least some of the one or more identified portions of the video content from the remote device.

11. The system of claim of 10, wherein at least a portion of the capture information is generated by an image signal processor of the image capture device that captured the video content.

12. The system of claim 10, wherein at least a portion of the capture information is generated by a signal processor external to the image capture device that captured the video content, the portion of the capture information generated by the signal processor during the capture of the video content, wherein the portion of the capture information is transmitted to the image capture device for storage.

13. The system of claim 10, wherein the remote device is configured to, responsive to the reception of the identification, transmit the video information defining at least some of the one or more identified portions of the video content.

14. The system of claim 13, wherein the remote device is, to transmit the video information defining at least some of the one or more identified portions of the video content, further configured to:

generate derivative visual information defining one or more derivative visual content based on the one or more identified portions of the video content, individual derivative visual content corresponding to and generated from the individual identified portions of the video content, the individual derivative visual content characterized by lower fidelity than the corresponding individual identified portions of the video content;

transmit the derivative visual information defining the one or more derivative visual content;

receive one or more selections of the derivative visual content; and transmit the video information defining one or more of the identified portions of the video content corresponding to the one or more selected derivative visual content.

15. The system of claim 10, wherein the one or more physical processors are, to identify the one or more portions of the video content based on the capture information, further configured by the machine-readable instructions to:

identify one or more undesired portions of the video content based on at least some of the capture information; and identify the one or more portions of the video content based on an inverse of the one or more undesired portions of the video content.

16. The system of claim 10, wherein the one or more physical processors are included in a mobile device or a server, and the remote device includes an image capture device.

17. The system of claim 16, wherein:

the image capture device is configured to switch between operation in an advertisement mode to advertise availability of the capture information to the mobile device or the server and operation in a transfer mode to transmit the capture information to the mobile device or the server;

the image capture device operates in the advertisement mode to detect when the computing device is ready to receive the capture information;

the image capture device operates in the transfer mode responsive to detection of the computing device; and the image capture device operating in the advertisement mode consumes less power than the image capture device operating in the transfer mode.

18. A method for identifying moments in videos, the method comprising:

receiving capture information for video content from a remote device prior to reception of video information defining the video content from the remote device, the capture information characterizing capture of the video content by an image capture device and/or the video content captured by the image capture device, the capture information enabling identification of one or more portions of the video content prior to reception of the video content;

identifying, prior to the reception of the video information, the one or more portions of the video content based on the capture information;

transmitting the identification of the one or more identified portions of the video content to the remote device; and receiving the video information defining at least some of the one or more identified portions of the video content from the remote device.

19. The method of claim of 18, wherein at least a portion of the capture information is generated by an image signal processor of the image capture device that captured the video content.

20. The method of claim 18, wherein at least a portion of the capture information is generated by a signal processor external to the image capture device that captured the video content, the portion of the capture information generated by the signal processor during the capture of the video content, wherein the portion of the capture information is transmitted to the image capture device for storage.

21. The method of claim 18, wherein the remote device is configured to, responsive to the reception of the identification, transmit the video information defining at least some of the one or more identified portions of the video content.

22. The method of claim 18, wherein identifying the one or more portions of the video content based on the capture information includes:

identifying one or more undesired portions of the video content based on at least some of the capture information; and identifying the one or more portions of the video content based on an inverse of the one or more undesired portions of the video content.

\* \* \* \* \*